(12) United States Patent
Katou et al.

(10) Patent No.: US 12,129,896 B2
(45) Date of Patent: Oct. 29, 2024

(54) POWER TRANSMISSION MECHANISM AND VEHICLE

(71) Applicant: NTN CORPORATION, Osaka (JP)

(72) Inventors: Takuya Katou, Shizuoka (JP); Kenji Terada, Shizuoka (JP); Yasunori Kawasaki, Shizuoka (JP)

(73) Assignee: NTN CORPORATION, Osaka (JP)

( * ) Notice: Subject to any disclaimer, the term of this patent is extended or adjusted under 35 U.S.C. 154(b) by 425 days.

(21) Appl. No.: 17/621,346

(22) PCT Filed: Jun. 18, 2020

(86) PCT No.: PCT/JP2020/023895
§ 371 (c)(1),
(2) Date: Dec. 21, 2021

(87) PCT Pub. No.: WO2021/005993
PCT Pub. Date: Jan. 14, 2021

(65) Prior Publication Data
US 2022/0364609 A1 Nov. 17, 2022

(30) Foreign Application Priority Data
Jul. 5, 2019 (JP) .................................. 2019-126053

(51) Int. Cl.
*F16D 3/2245* (2011.01)
*B60K 17/22* (2006.01)

(52) U.S. Cl.
CPC ............ *F16D 3/2245* (2013.01); *B60K 17/22* (2013.01)

(58) Field of Classification Search
CPC .. B60K 17/04; B60K 17/22; B60K 2001/001; F16D 3/202; F16D 3/22; F16D 3/223; F16D 3/224; F16D 3/227
See application file for complete search history.

(56) References Cited

U.S. PATENT DOCUMENTS

| 4,573,947 A | * | 3/1986 | Hazebrook | ............. | F16D 3/227 |
| | | | | | 464/146 |
| 6,280,338 B1 | * | 8/2001 | Hayama | .................. | F16D 3/223 |
| | | | | | 464/146 |

(Continued)

FOREIGN PATENT DOCUMENTS

| CN | 101725643 | 6/2010 |
| CN | 201610050 | 10/2010 |

(Continued)

OTHER PUBLICATIONS

International Preliminary Report on Patentability and Written Opinion of the International Searching Authority issued Jan. 11, 2022 in International (PCT) Application No. PCT/JP2020/023895.

(Continued)

*Primary Examiner* — Josh Skroupa
(74) *Attorney, Agent, or Firm* — Wenderoth, Lind & Ponack, L.L.P.

(57) ABSTRACT

A power transmission mechanism (2) includes left and right drive shafts (3L, 3R) that transmit rotational torque from a drive source to drive wheels provided on left and right sides of a vehicle. In the right drive shaft (3R) and the left drive shaft (3L), the numbers of rolling elements (23, 33) included in plunging type constant velocity universal joints (6L, 6R) are different from each other.

4 Claims, 5 Drawing Sheets

(56) References Cited

U.S. PATENT DOCUMENTS

| | | | |
|---|---|---|---|
| 8,435,125 B2 * | 5/2013 | Ooba | B60K 17/22 |
| | | | 464/902 |
| 8,556,737 B2 * | 10/2013 | Yamauchi | B60B 27/0005 |
| | | | 464/178 |
| 8,714,293 B2 * | 5/2014 | Despres-Nadeau | F16D 3/223 |
| | | | 464/139 |
| 10,150,335 B2 * | 12/2018 | Nagata | F16D 3/223 |
| 10,550,894 B2 * | 2/2020 | Takabe | F16D 3/24 |
| 10,774,878 B2 * | 9/2020 | Aminaka | F16D 3/223 |
| 10,829,714 B2 * | 11/2020 | Arai | F16D 3/20 |
| 10,933,462 B2 * | 3/2021 | Mano | F16D 3/227 |
| 11,326,649 B2 * | 5/2022 | Kobayashi | F16D 3/227 |
| 11,353,066 B2 * | 6/2022 | Kobayashi | F16D 3/2245 |
| 11,359,676 B2 * | 6/2022 | Kobayashi | F16D 3/2245 |
| 11,359,677 B2 * | 6/2022 | Kobayashi | F16D 3/227 |
| 11,371,564 B2 * | 6/2022 | Sugiyama | F16D 3/227 |
| 11,767,876 B2 * | 9/2023 | Itagaki | F16C 3/026 |
| | | | 464/181 |
| 2008/0045092 A1 * | 2/2008 | Roycroft | F16D 3/227 |
| | | | 440/12.5 |
| 2010/0093452 A1 | 4/2010 | Kim | |
| 2014/0090917 A1 | 4/2014 | Despres-Nadeau | |

FOREIGN PATENT DOCUMENTS

| | | |
|---|---|---|
| CN | 104718390 | 6/2015 |
| CN | 208198005 | 12/2018 |
| EP | 3 597 949 | 1/2020 |
| JP | 59-124735 | 8/1984 |
| JP | S62-286833 | 12/1987 |
| JP | 10-122253 | 5/1998 |
| JP | 2001-113972 | 4/2001 |
| JP | 2005-199894 | 7/2005 |
| JP | 2009-292275 | 12/2009 |
| JP | 2011-058639 | 3/2011 |
| JP | 2018-155403 | 10/2018 |

OTHER PUBLICATIONS

International Search Report issued Sep. 15, 2020 in International (PCT) Application No. PCT/JP2020/023895.

* cited by examiner

POWER TRANSMISSION MECHANISM AND VEHICLE

TECHNICAL FIELD

The present invention relates to a power transmission mechanism and a vehicle.

BACKGROUND ART

As a power transmission mechanism that transmits rotational torque from a drive source such as an engine or an electric motor mounted on a vehicle to left and right drive wheels, there is used a drive shaft including an outboard-side constant velocity universal joint arranged on the drive wheel side, an inboard-side constant velocity universal joint arranged on the opposite side to the drive wheel side, and an intermediate shaft connecting both the constant velocity universal joints together.

Normally, as the constant velocity universal joint on the outboard side, a fixed type constant velocity universal joint is used which takes a large operating angle but is not displaced in the axial direction. On the other hand, as the constant velocity universal joint on the inboard side, a plunging type constant velocity universal joint is used which has a relatively small maximum operating angle but can be displaced in the axial direction while taking the operating angle.

Incidentally, in the above drive shaft, it is known that when the rotational torque is transmitted in a state where the constant velocity universal joint takes an operating angle, an induced thrust force in the axial direction is generated during rotation. The induced thrust force is an axial force generated corresponding to the number of rollers or balls during one rotation of the constant velocity universal joint, and tends to be generated more easily in the plunging type constant velocity universal joint than in the fixed type constant velocity universal joint. For example, in the case of a tripod type constant velocity universal joint (TJ) having three rollers, the induced thrust force is generated three times during one rotation, and in the case of a double offset type constant velocity universal joint (DOJ) having six balls, the induced thrust force is generated six times during one rotation. When these induced thrust forces resonate with an engine, a transmission, or mounting means of a differential device, this causes vibration or abnormal noise of the vehicle.

As a countermeasure against this, conventionally, a technique has been proposed in which the generation of vibration and abnormal noise caused by the induced thrust force is suppressed by shifting the angular phase of each rolling element (roller or ball) of the plunging type constant velocity universal joint on the inboard side and the fixed type constant velocity universal joint on the outboard side (see Patent Literature 1).

CITATIONS LIST

Patent Literature 1: JP H10-122253 A

SUMMARY OF INVENTION

Technical Problem

However, in recent years, there has been an increasing demand for improvement in noise, vibration, and harshness, so-called NVH characteristics. In particular, in a motor-driven vehicle that is required to have quietness, because the motor-driven vehicle is lighter than an engine-driven vehicle and has high rotational torque input to the drive shaft at the time of starting or accelerating, there is a possibility that the conventional technique cannot sufficiently suppress the vibration and abnormal noise caused by the induced thrust force.

Therefore, an object of the present invention is to provide a power transmission mechanism that can effectively suppress the vibration and abnormal noise caused by the induced thrust force, and a vehicle including the power transmission mechanism.

Solution to Problem

The present invention is a power transmission mechanism including left and right drive shafts that transmit rotational torque from a drive source to drive wheels provided on left and right sides of a vehicle. The left and right drive shafts include an intermediate shaft, a fixed type constant velocity universal joint connected to an end of the intermediate shaft on a drive wheel side, and a plunging type constant velocity universal joint connected to an end of the intermediate shaft on a side opposite to the drive wheel side. The plunging type constant velocity universal joint includes an outer joint member in which a track groove is formed on an inner peripheral surface, a rolling element rollably arranged in the track groove, and an inner joint member that transmits rotational torque through the rolling element while allowing angular displacement and axial displacement with respect to the outer joint member.

In the present invention, in the left and right drive shafts included in such a power transmission mechanism, numbers of rolling elements included in the respective plunging type constant velocity universal joints are made different from each other. As a result, the frequencies (timings) at which the induced thrust forces generated in the left and right plunging type constant velocity universal joints are maximized can be made different from each other. As a result, the induced thrust forces generated in the left and right plunging type constant velocity universal joints do not easily resonate with each other, and the vibration and abnormal noise generated in the vehicle due to the induced thrust force can be effectively suppressed.

Furthermore, in the left and right drive shafts, by making the numbers of rolling elements included in the respective fixed type constant velocity universal joints different from each other, the frequencies (timings) at which the induced thrust forces generated in these are maximized can also be made different from each other. As a result, the induced thrust forces generated in the left and right fixed type constant velocity universal joints do not easily resonate with each other, and the vibration and abnormal noise caused by the induced thrust force can be more effectively suppressed.

The present invention is particularly suitable in the case where the drive source is an electric motor. That is, in a motor-driven vehicle using the electric motor as a drive source, because the motor-driven vehicle is required to have a high level of quietness as compared with an engine-driven vehicle, is lightweight, and has high rotational torque input to the drive shaft at the time of starting or accelerating, generation of the vibration and abnormal noise caused by the induced thrust force tends to be remarkable. Therefore, a particularly large effect can be obtained by applying the present invention to such a motor-driven vehicle.

In addition, by applying the power transmission mechanism according to the present invention to a vehicle, generation of the vibration and abnormal noise caused by the induced thrust force can be highly suppressed, and a vehicle excellent in NVH characteristics can be provided.

Advantageous Effects of Invention

According to the present invention, the vibration and abnormal noise caused by the induced thrust force can be effectively suppressed.

DESCRIPTION OF EMBODIMENTS

Hereinafter, embodiments of the present invention are described with reference to the accompanying drawings. In the drawings for describing the present invention, constituent elements such as members and constituent parts having the same function or shape are denoted by the same reference numerals as long as they can be discriminated, and the description thereof is omitted.

Figure 1:
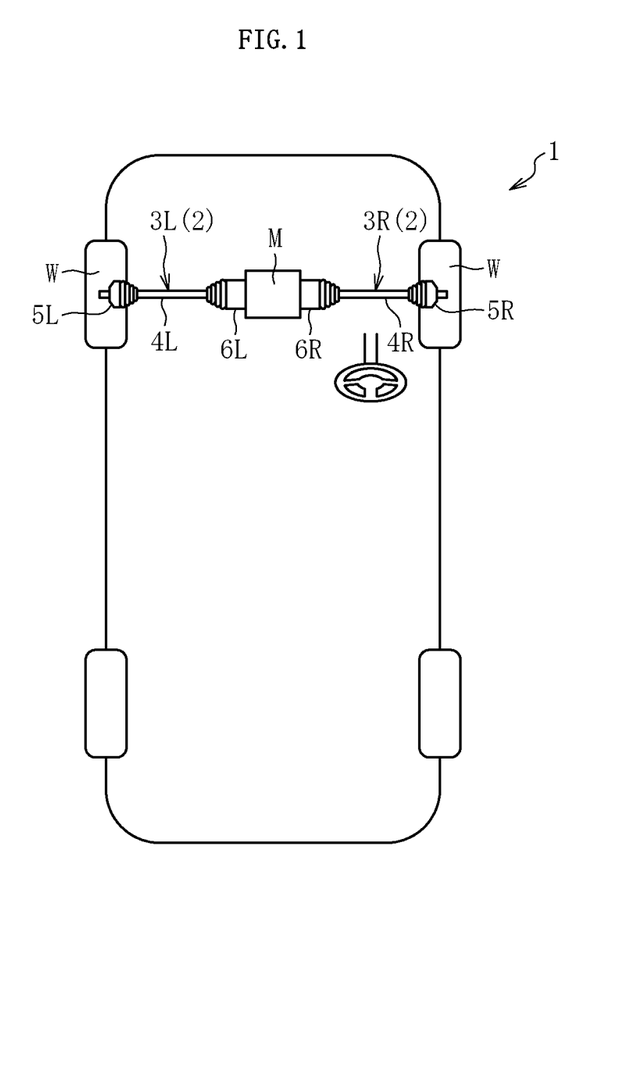
FIG. 1 is a plan view illustrating a schematic configuration of a power transmission mechanism mounted on an electric vehicle.

FIG. 1 illustrates a schematic configuration of a power transmission mechanism mounted on an electric vehicle.

An electric vehicle 1 illustrated in FIG. 1 is a front wheel drive type motor-driven vehicle. The electric vehicle 1 includes left and right drive shafts 3L and 3R as a power transmission mechanism 2 that transmits the rotational torque of an electric motor M as a drive source to left and right front wheels W as drive wheels. The drive shafts 3L and 3R include intermediate shafts 4L and 4R, outboard side (vehicle outer side) fixed type constant velocity universal joints 5L and 5R connected to ends on the front wheel W side of the intermediate shafts 4L and 4R, and inboard side (vehicle inner side) plunging type constant velocity universal joints 6L and 6R connected to ends on the inboard side (vehicle inner side) of the intermediate shafts 4L and 4R opposite to the front wheel W side, respectively. Because the electric motor M and the left and right front wheels W are connected with the drive shafts 3L and 3R interposed therebetween, the rotational torque can be transmitted from the electric motor M to each of the front wheels W.

Figure 2:
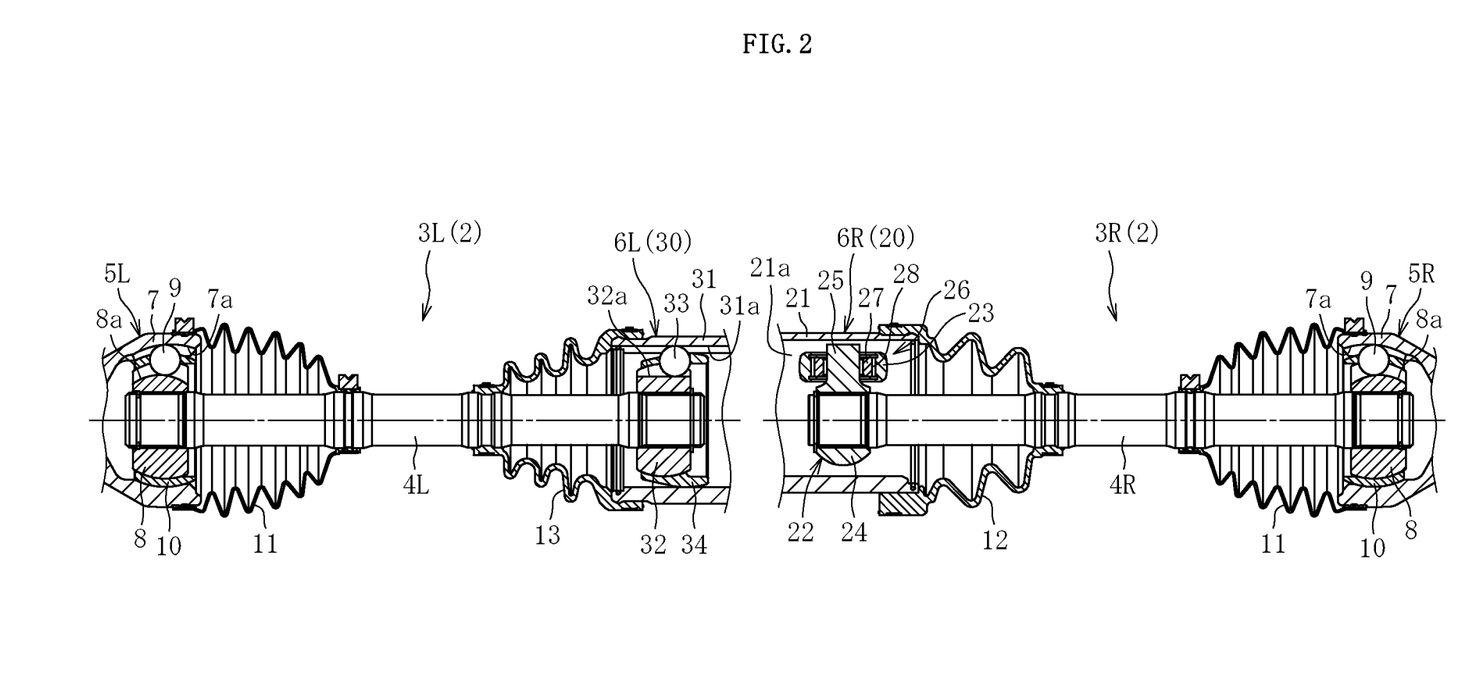
FIG. 2 is a longitudinal sectional view of left and right drive shafts according to an embodiment of the present invention.

FIG. 2 illustrates a configuration of the left and right drive shafts according to the embodiment of the present invention.

First, configurations of the fixed type constant velocity universal joints 5L and 5R provided in the left and right drive shafts 3L and 3R are described with reference to FIG. 2.

As illustrated in FIG. 2, the fixed type constant velocity universal joints 5L and 5R included respectively in the drive shafts 3L and 3R each includes, as main constituent elements, an outer joint member 7 as an outer joint member connected to the front wheel W, an inner joint member 8 as an inner joint member connected to the intermediate shafts 4L and 4R, a plurality of balls 9 as rolling elements, and a cage 10.

The outer joint member 7 is a cup-shaped member having one end opened and is formed with a plurality of arc-shaped track grooves 7a extending in the axial direction on the inner peripheral surface thereof at equal intervals in the circumferential direction. On the other hand, the inner joint member 8 is a cylindrical member and is formed with a plurality of arc-shaped track grooves 8a facing the track grooves 7a of the outer joint member 7 on the outer peripheral surface thereof at equal intervals in the circumferential direction. The balls 9 are arranged one by one between the track groove 7a of the outer joint member 7 and the track groove 8a of the inner joint member 8, and each ball 9 is rollably held by the cage 10 interposed between the outer joint member 7 and the inner joint member 8. In addition, a boot 11 is attached between the outer joint member 7 and each of the intermediate shafts 4L and 4R for the purpose of preventing foreign matter from entering the joint and preventing leakage of grease sealed in the joint.

In the fixed type constant velocity universal joints 5L and 5R, when an operating angle is applied between the outer joint member 7 and the inner joint member 8, the ball 9 moves along the track grooves 7a and 8a, so that the ball 9 is always maintained in a bisector plane of the operating angle at any operating angle. As a result, the rotational torque is transmitted at a constant speed between the outer joint member 7 and the inner joint member 8 through the balls 9.

Here, in the left and right drive shafts 3L and 3R according to the present embodiment, fixed type constant velocity universal joints having the same structure are used as the fixed type constant velocity universal joints 5L and 5R. On the other hand, plunging type constant velocity universal joints having different structures are used for the plunging type constant velocity universal joints 6L and 6R provided in the drive shafts 3L and 3R. Specifically, in the present embodiment, a tripod type constant velocity universal joint (TJ) 20 is used as the plunging type constant velocity universal joint 6R on the right side, and a double offset type constant velocity universal joint (EDJ) 30 is used as the plunging type constant velocity universal joint 6L on the left side.

Next, a configuration of the tripod type constant velocity universal joint 20 used as the plunging type constant velocity universal joint 6R on the right side is described with reference to FIGS. 2 and 3.

Figure 3:
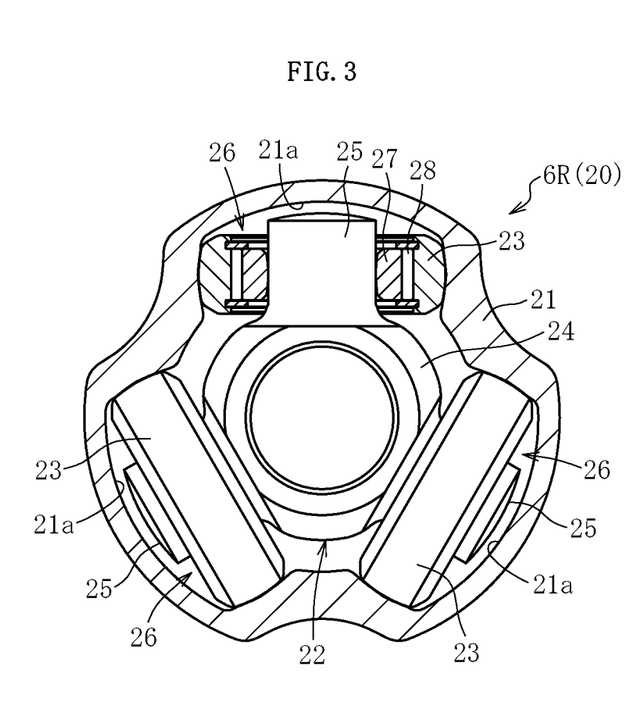
FIG. 3 is a cross-sectional view of a tripod type constant velocity universal joint.

As illustrated in FIGS. 2 and 3, the tripod type constant velocity universal joint 20 includes, as main constituent elements, an outer joint member 21 as an outer joint member connected to the electric motor M, a tripod member 22 as an inner joint member connected to the intermediate shaft 4R, and three rollers 23 as rolling elements.

The outer joint member 21 is a cup-shaped member having one end opened and is formed with three linear track grooves 21a extending in the axial direction on the inner peripheral surface thereof at equal intervals in the circumferential direction. The tripod member 22 has a cylindrical boss 24 and three leg shafts 25 protruding in the radial direction from the boss 24. A roller unit 26 including a roller 23 and the like is attached to each leg shaft 25. The roller unit 26 includes the roller 23 as an outer ring, an inner ring 27 arranged inside the roller 23 and externally fitted to the leg shaft 25, and a large number of needle rollers 28 interposed between the roller 23 and the inner ring 27. The roller units 26 are arranged one by one in each track groove 21a of the outer joint member 21, and as the roller 23 moves along the track groove 21a, the tripod member 22 can transmit the rotational torque while allowing angular displacement and axial displacement with respect to the outer joint member 21. Similarly to the fixed type constant velocity universal joints 5L and 5R, a boot 12 is attached between the outer joint member 21 and the intermediate shaft 4R.

Next, the configuration of the double offset type constant velocity universal joint 30 used as the plunging type constant velocity universal joint 6L on the left side is described with reference to FIGS. 2 and 4.

Figure 4:
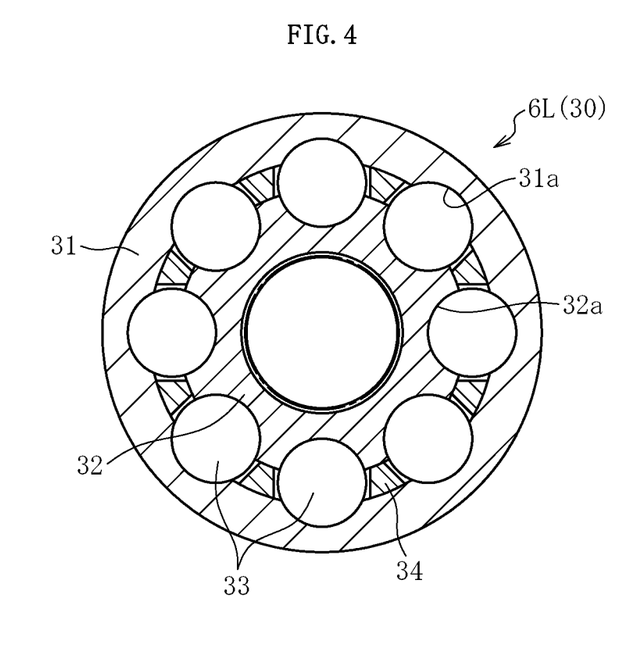
FIG. 4 is a cross-sectional view of a double offset type constant velocity universal joint.

As illustrated in FIGS. 2 and 4, the double offset type constant velocity universal joint 30 includes, as main constituent elements, an outer joint member 31 as an outer joint member connected to the electric motor M, an inner joint member 32 as an inner joint member connected to the intermediate shaft 4L, eight balls 33 as rolling elements, and a cage 34.

The outer joint member 31 is a cup-shaped member having one end opened and is formed with eight linear track grooves 31a extending in the axial direction on the inner peripheral surface thereof at equal intervals in the circumferential direction. On the other hand, the inner joint member 32 is a cylindrical member, and is formed with eight linear track grooves 32a facing the track grooves 31a of the outer joint member 31, on the outer peripheral surface thereof at equal intervals in the circumferential direction. The balls 33 are arranged one by one between the track groove 31a of the outer joint member 31 and the track groove 32a of the inner joint member 32, and each ball 33 is rollably held by the cage 34 interposed between the outer joint member 31 and the inner joint member 32. As each ball 33 moves along each of the track grooves 31a and 32a, the inner joint member 32 can transmit rotational torque to the outer joint member 31 while allowing angular displacement and axial displacement. Similarly to the fixed type constant velocity universal joints 5L and 5R, a boot 13 is attached between the outer joint member 31 and the intermediate shaft 4L.

As described above, in the power transmission mechanism 2 according to the present embodiment, the plunging type constant velocity universal joints including different numbers of rolling elements from each other are used as the plunging type constant velocity universal joints 6L and 6R provided in the left and right drive shafts 3L and 3R. Therefore, when the drive shafts 3L and 3R rotate, the manners of generating the induced thrust force in the respective plunging type constant velocity universal joints 6L and 6R are different from each other. That is, because the induced thrust force is generated corresponding to the number of rollers or balls during one rotation, the maximum induced thrust force is generated every 120° rotation in the tripod type constant velocity universal joint 20 including three rollers, and the maximum induced thrust force is generated every 45° rotation in the double offset type constant velocity universal joint 30 including eight balls.

As described above, in the present embodiment, the frequencies (timings) at which the induced thrust force generated in the left and right plunging type constant velocity universal joints 6L and 6R are maximized can be made different from each other by using the plunging type constant velocity universal joints having the numbers of rolling elements different from each other. As a result, the induced thrust forces generated in the left and right plunging type constant velocity universal joints 6L and 6R do not easily resonate with each other, and the vibration and abnormal noise generated in the vehicle due to the induced thrust force can be effectively suppressed.

On the other hand, because the fixed type constant velocity universal joint does not easily generate the induced thrust force as compared to the plunging type constant velocity universal joint, in the present embodiment, the fixed type constant velocity universal joints including the same number of balls are used for the right fixed type constant velocity universal joint 5R and the left fixed type constant velocity universal joint 5L. The number of balls included in the left and right fixed type constant velocity universal joints 5L and 5R may be, for example, six as illustrated in FIG. 5 or eight as illustrated in FIG. 6.

In addition, in order to further suppress the vibration and abnormal noise caused by the induced thrust force, fixed type constant velocity universal joints including different numbers of balls from each other may be used for the left and right fixed type constant velocity universal joints 5L and 5R.

Figure 7:
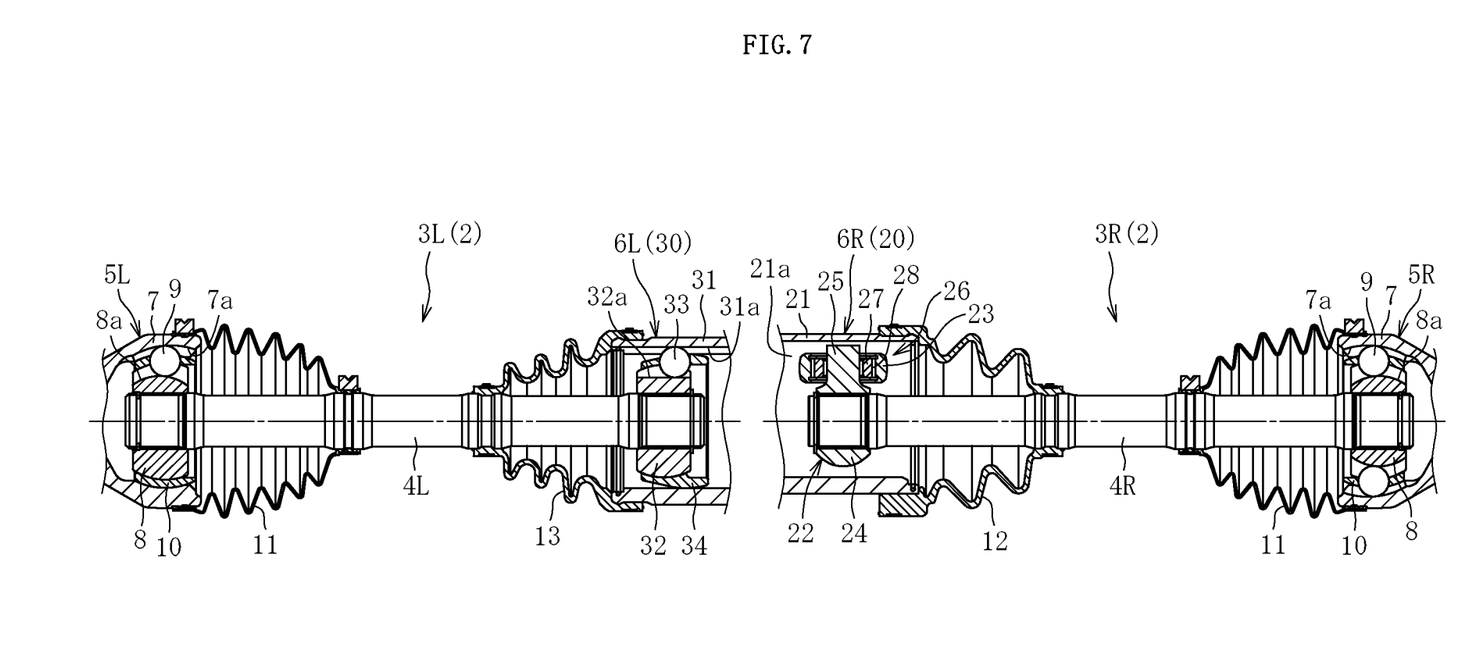
FIG. 7 is a longitudinal sectional view of left and right drive shafts according to another embodiment of the present invention.

FIG. 7 illustrates an embodiment using fixed type constant velocity universal joints including different numbers of balls from each other.

Figure 5:
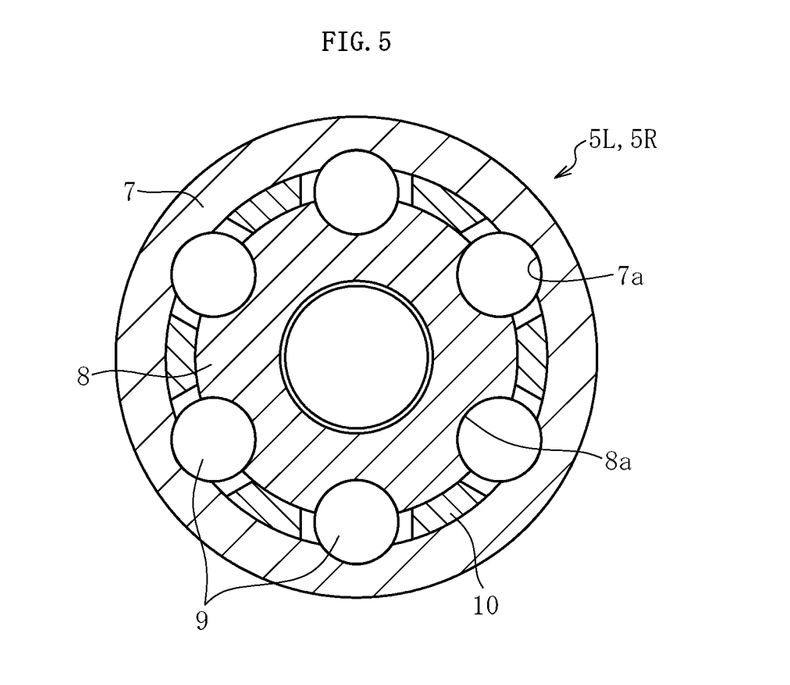
FIG. 5 is a cross-sectional view of a fixed type constant velocity universal joint including six balls.
Figure 6:
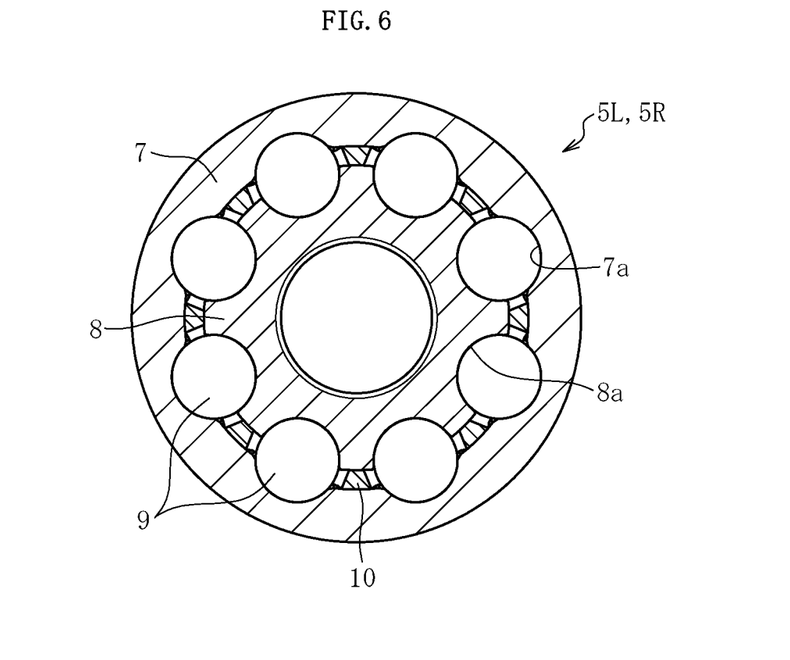
FIG. 6 is a cross-sectional view of a fixed type constant velocity universal joint including eight balls.

In the embodiment illustrated in FIG. 7, a fixed type constant velocity universal joint including eight balls 9 as illustrated in FIG. 6 is used as a fixed type constant velocity universal joint 5R included in a right drive shaft 3R, and a fixed type constant velocity universal joint including six balls as illustrated in FIG. 5 is used as a fixed type constant velocity universal joint 5L included in a left drive shaft 3L. In plunging type constant velocity universal joints 6L and 6R, similarly to the above-described embodiment, the right side is a tripod type constant velocity universal joint 20, and the left side is a double offset type constant velocity universal joint 30.

As described above, by using the fixed type constant velocity universal joints having different numbers of rolling elements as the left and right fixed type constant velocity universal joints 5L and 5R, the frequencies (timings) at which the induced thrust forces generated in the fixed type constant velocity universal joints 5L and 5R are maximized can be made different from each other. As a result, the induced thrust forces generated in the left and right fixed type constant velocity universal joints 5L and 5R do not easily resonate with each other, and the vibration and abnormal noise caused by the induced thrust force can be more effectively suppressed.

In the embodiment illustrated in FIG. 7, the numbers of rolling elements are different between the fixed type constant velocity universal joint 5R and the plunging type constant velocity universal joint 6R included in the right drive shaft 3R and between the fixed type constant velocity universal joint 5L and the plunging type constant velocity universal joint 6L included in the left drive shaft 3L. That is, because the right drive shaft 3R is constituted of a combination of the fixed type constant velocity universal joint 5R including eight balls 9 and the tripod type constant velocity universal joint 20 including three rollers 23, and the left drive shaft 3L is constituted of a combination of the fixed type constant velocity universal joint 5L including six balls 9 and the double offset type constant velocity universal joint 30 including eight balls 33, the numbers of rolling elements are different between the fixed type constant velocity universal joint and the plunging type constant velocity universal joint. Therefore, the induced thrust forces do not easily resonate with each other between the fixed type constant velocity universal joint and the plunging type constant velocity universal joint included respectively in the drive shafts 3L and 3R, and the vibration and abnormal noise are further less likely to be generated.

Although the embodiment of the present invention has been described above, the present invention is not limited to the above-described embodiments, and can be appropriately changed without departing from the sheet of the invention.

In the above-described embodiments, as the fixed type constant velocity universal joint, a so-called bar field type constant velocity universal joint (BJ) in which the track groove includes only a circular arc part is used, but a so-called undercut free type constant velocity universal joint (UJ) in which the track groove includes a circular arc part and a linear part may be used. Further, the fixed type constant velocity universal joint is not limited to the one including six balls or eight balls, and may include more than eight balls.

In addition, the combination of the plunging type constant velocity universal joint on the right side and the plunging type constant velocity universal joint on the left side is not limited to the above-described embodiments. For example, when one plunging type constant velocity universal joint is a tripod type constant velocity universal joint (TJ) including three rollers, the other plunging type constant velocity universal joint may be a double offset type constant velocity universal joint (DOJ) including six balls instead of the double offset type constant velocity universal joint (EDJ) including eight balls described above. Alternatively, one plunging type constant velocity universal joint may be a double offset type constant velocity universal joint (EDJ) including eight balls, and the other plunging type constant velocity universal joint may be a double offset constant velocity universal joint (DOJ) including six balls.

The present invention is applicable not only to a front wheel drive type vehicle but also to a rear wheel drive type vehicle and a four-wheel drive type vehicle. In addition, the motor-driven vehicle to which the present invention is applied may be a one-motor type in which the left and right drive wheels are driven by one common electric motor, or may be a two-motor type in which the left and right drive wheels are independently driven by two motors. A power transmission mechanism such as a speed reducer may be interposed between the electric motor and the plunging type constant velocity universal joint of the drive shaft.

In the present invention, in order to more reliably suppress the vibration and abnormal noise caused by the induced thrust force, the phases in the joint circumferential direction of all the rolling elements included in the constant velocity universal joints may be made different between the constant velocity universal joints in which resonance of the induced thrust force is desired to be avoided. That is, between the right and left plunging type constant velocity universal joints 6L and 6R, between the right and left fixed type constant velocity universal joints 5L and 5R, or between the fixed type constant velocity universal joints 5L and 5R and the plunging type constant velocity universal joints 6L and 6R, the joint circumferential phases of all the rolling elements included therein may be different from each other. This can more reliably suppress the vibration and abnormal noise caused by the induced thrust force.

As described above, according to the present invention, by using the plunging type constant velocity universal joints provided with the numbers of rolling elements different from each other for the left and right plunging type constant velocity universal joints in which the induced thrust force is easily generated, the timings of the maximum induced thrust force generated in these joints can be made different from each other, and the vibration and abnormal noise caused by the induced thrust force can be effectively suppressed. As a result, the vibration and abnormal noise are not easily generated in the vehicle, and a vehicle having excellent NVH characteristics can be provided. The present invention is applicable not only to the motor-driven vehicle such as the electric vehicle but also to an engine-driven vehicle. In particular, in the motor-driven vehicle in which the vibration and abnormal noise caused by the induced thrust force are remarkable, a particularly large effect can be obtained by applying the present invention.

REFERENCE SIGNS LIST

1 Electric vehicle
2 Power transmission mechanism
3L, 3R Drive shaft
4L, 4R Intermediate shaft
5L, 5R Fixed type constant velocity universal joint
6L, 6R Plunging type constant velocity universal joint
7 Outer joint member (Outer joint member)
7a Track groove
8 Inner joint member (Inner joint member)
8a Track groove
9 Ball (Rolling element)
10 Cage
20 Tripod type constant velocity universal joint
21 Outer joint member (Outer joint member)
21a Track groove
22 Tripod member (Inner joint member)
23 Roller (Rolling element)
30 Double offset type constant velocity universal joint
31 Outer joint member (Outer joint member)
31a Track groove
32 Inner joint member (Inner joint member)
32a Track groove
33 Ball (Rolling element)
34 Cage
M Electric motor (Drive source)
W Front wheel (Drive wheel)

The invention claimed is:

1. A power transmission mechanism comprising left and right drive shafts that transmit rotational torque from a drive source to drive wheels provided on left and right sides of a vehicle, wherein
the left and right drive shafts include an intermediate shaft, a fixed type constant velocity universal joint connected to an end of the intermediate shaft on a drive wheel side, and a plunging type constant velocity universal joint connected to an end of the intermediate shaft on a side opposite to the drive wheel side,
the plunging type constant velocity universal joint includes an outer joint member in which a track groove is formed on an inner peripheral surface, a rolling element rollably arranged in the track groove, and an inner joint member that transmits rotational torque through the rolling element while allowing angular displacement and axial displacement with respect to the outer joint member,
in the left and right drive shafts, numbers of the rolling elements included in the respective plunging type constant velocity universal joints are different from each other,
the fixed type constant velocity universal joint includes an outer joint member in which a track groove is formed on an inner peripheral surface, an inner joint member in which a track groove is formed on an outer peripheral surface, a rolling element that is arranged between the track groove of the outer joint member and the track groove of the inner joint member and transmits rotational torque, and a cage that holds the rolling element rollably, and in the left and right drive shafts, numbers of the rolling elements included in the respective fixed type constant velocity universal joints are different from each other.

2. The power transmission mechanism according to claim 1, wherein the drive source is an electric motor.

3. A vehicle comprising the power transmission mechanism according to claim 2.

4. A vehicle comprising the power transmission mechanism according to claim 1.

* * * * *